(12) United States Patent
Mills

(10) Patent No.: US 8,382,201 B2
(45) Date of Patent: Feb. 26, 2013

(54) MULTI-USE PROTECTIVE COVER

(76) Inventor: Ginelle Mills, Walnut Creek, CA (US)

( * ) Notice: Subject to any disclaimer, the term of this patent is extended or adjusted under 35 U.S.C. 154(b) by 271 days.

(21) Appl. No.: 12/748,299

(22) Filed: Mar. 26, 2010

(65) Prior Publication Data

US 2010/0314915 A1  Dec. 16, 2010

Related U.S. Application Data

(60) Provisional application No. 61/163,568, filed on Mar. 26, 2009.

(51) Int. Cl.
*A47C 31/02* (2006.01)
*A47C 31/11* (2006.01)
*A47D 1/10* (2006.01)

(52) U.S. Cl. ............... 297/219.12; 297/256.17

(58) Field of Classification Search ............ 297/219.12, 297/256.17
See application file for complete search history.

(56) References Cited

U.S. PATENT DOCUMENTS

| | | | |
|---|---|---|---|
| 4,325,578 A | 4/1982 | Borucki | |
| 4,666,207 A * | 5/1987 | Quartano | 297/219.12 X |
| 5,533,934 A | 7/1996 | Miller | |
| 5,547,250 A * | 8/1996 | Childers | 297/256.17 |
| 5,588,699 A | 12/1996 | Rundle et al. | |
| 5,678,888 A * | 10/1997 | Sowell et al. | 297/256.17 |
| 5,735,576 A * | 4/1998 | Pepys et al. | 297/219.12 X |
| 6,206,471 B1 * | 3/2001 | McGowan | 297/256.17 |
| 6,237,998 B1 * | 5/2001 | Aprile | 297/219.12 |
| 6,511,123 B1 | 1/2003 | Sitarski et al. | |
| 6,648,411 B2 | 11/2003 | Julien | |
| 6,659,564 B2 | 12/2003 | Kassai et al. | |
| 6,752,457 B2 * | 6/2004 | Gold et al. | 297/219.12 |
| 6,848,743 B1 * | 2/2005 | Collins | 297/256.17 |
| 6,851,749 B2 * | 2/2005 | Norman | 297/256.17 |
| 6,860,555 B2 * | 3/2005 | Kassai et al. | 297/219.12 |
| 6,926,359 B2 * | 8/2005 | Runk | 297/219.12 |
| D513,146 S | 12/2005 | Griffin | |
| 7,175,535 B1 | 2/2007 | Marmentini | |
| 7,367,621 B1 * | 5/2008 | Han-Dressor et al. | 297/256.17 |
| 7,410,213 B1 * | 8/2008 | Ferrari-Cicero et al. | 297/219.12 |
| 7,677,661 B1 * | 3/2010 | Ferrari-Cicero et al. | 297/219.12 |
| 7,878,587 B1 * | 2/2011 | Leach | 297/219.12 |
| 2001/0048235 A1 * | 12/2001 | Hartranft | 297/219.12 |
| 2004/0066070 A1 * | 4/2004 | Sampson et al. | 297/256.17 |
| 2007/0102079 A1 * | 5/2007 | Billock | 150/154 |
| 2008/0079297 A1 * | 4/2008 | Braxton Perry | 297/219.12 |
| 2008/0136231 A1 * | 6/2008 | Doherty | 297/219.12 |
| 2008/0258528 A1 * | 10/2008 | Bush et al. | 297/256.17 |

OTHER PUBLICATIONS

D D & G Holdings 1, LLC, "Baby Bee Cool", "Baby Bee Cool", Feb. 23, 2006, Publisher: www.babybeecool.com, Published in: US.
Unknown, "Car Seat Shade from LionHeart", "Car Seat Shade", Mar. 25, 2006, Publisher: http://www.princelionheart.com/site_irl/t_cs_0991.html, Published in: US.
Unknown, "Car seat sun shade", "Car Seat sun shade", Jun. 6, 2008, Publisher: www.mommyshelperinc.com, Published in: US.

(Continued)

*Primary Examiner* — Rodney B White
(74) *Attorney, Agent, or Firm* — Stuart J. West; Shaun N. Sluman; West & Associates, A PC

(57) ABSTRACT

A safety device for children, specifically a cover for use with a variety of surfaces that provides a barrier to protect a child from the heat and/or contamination of a surface. In some embodiments, the device can prevent a child from being burned or uncomfortable by the heat of a swing seat or car seat by minimizing thermal transfer between a child's skin and the swing seat for an adequate amount of time. In some embodiments, the cover can be used in a planar configuration as a changing pad or play mat.

11 Claims, 8 Drawing Sheets

OTHER PUBLICATIONS

The Chaden Company LLC, "Cold Seat", "Cold Seat", Apr. 20, 2007, Publisher: www.coldseat.com, Published in: US.

"Comfaset", "Comfaset", May 1, 2004, Publisher: www.caringparentdesigns.com, Published in: US.

Unknown, "The Cooling Car Summer Seat Cushion", "12v Cooling Car summer seat cushion", Dec. 1, 2008, Publisher: www.Activeforever.com, Published in: US.

Krista Walker, "Cool-Or-Heat Seat Cushion", "Cool-or-Heat Sear Cushion", Apr. 19, 2006, Publisher: www.coolorheat.com, Published in: US.

Unkown, "FlowCushion", "FlowCushion", Feb. 20, 2006, Publisher: www.flowcusion.com, Published in: US.

Patongo LLC, "Jing Joe", "Jing Joe", May 2, 2009, Publisher: jingjoe.com, Published in: US.

Unknown, "Maxsa Self Cooling Cushion", "Maxsa Self Cooling Cushion", Jun. 26, 2007, Publisher: www.maxsainnovations.com, Published in: US.

Unknown, "Seat Chiller Car Seat Cooler", Aug. 19, 2006, Publisher: http://www.unusualthreads.com/seatchiller.html, Published in: US.

Unknown, "Self-Cooling Seat Cushions by JB Enterprises", "Self-Cooling Cushions by JB Enterprises", Oct. 22, 2008, Publisher: http://selfcoolingproducts.com, Published in: US.

Unknown, "Suzukaze Kuchofuku air conditioned seat cushion", "Suzukaze Kuchofuku air conditioned seat cushion", Jun. 22, 2009, Publisher: http://www.japantrendshop.com, Published in: us.

Unknown, "SweetCheeks Swing Seat Cover", "SweetCheeks Swing Seat Cover", Jun. 11, 2009, Publisher: www.sweetcheeksswingcover.com, Published in: US.

"The Swing Scarf", "The Swing Scarf", Oct. 13, 2007, Publisher: www.theswingscarf.com, Published in: US.

\* cited by examiner

MULTI-USE PROTECTIVE COVER

CLAIM OF PRIORITY

The following application claims priority to U.S. Provisional Patent Application No. 61/163,568, filed Mar. 26, 2009, the complete contents of which are hereby incorporated by reference.

BACKGROUND

1. Field of the Invention

The present disclosure relates to the field of protective equipment for children, specifically a cover that can be used as a protective barrier between a child and a hot and/or unsanitary surface.

2. Background

Each day, children come into contact with multiple surfaces, whether they are at home, in restaurants, on playgrounds, in parks, at school, or in cars. However, the surfaces on which children sit or play are often soiled, germ-filled, and/or too hot for a child's delicate skin. Thus, it is often necessary to cover surfaces with a protective barrier to shield a child and protect their skin and health. However, many protective products are not designed for use outdoors, over surfaces that become extremely hot, and/or are difficult to clean. Moreover, many products that are currently on the market are unable to be configured for various uses, such as for use with bucket swing seats, high chairs, stroller, car seats, and shopping carts. Therefore, it is necessary to buy multiple products for each individual use. Additionally, many products on the market are not adapted for use as changing pads or play mats, and/or they are multi-part designs rather than one-piece products.

What is needed is a portable protective cover that can be used in a variety of applications. The cover should be lightweight, easy to clean, and in some embodiments should be a single unit having insulating properties to minimize thermal transfer between a hot surface and a child's skin for an adequate amount of time. The cover should be adapted to substantially conform to the interior surface geometry of a bucket-style swing seat, a high chair, and various other child seats. The cover should also be adapted for use as a changing pad and play pad. In some embodiments, the protective cover should also adequately shield all parts of a child's body that would normally come into contact with a swing seat or high chair seat without a cover. In some embodiments, the cover should be disposable after a single use.

DETAILED DESCRIPTION

Figure 1:
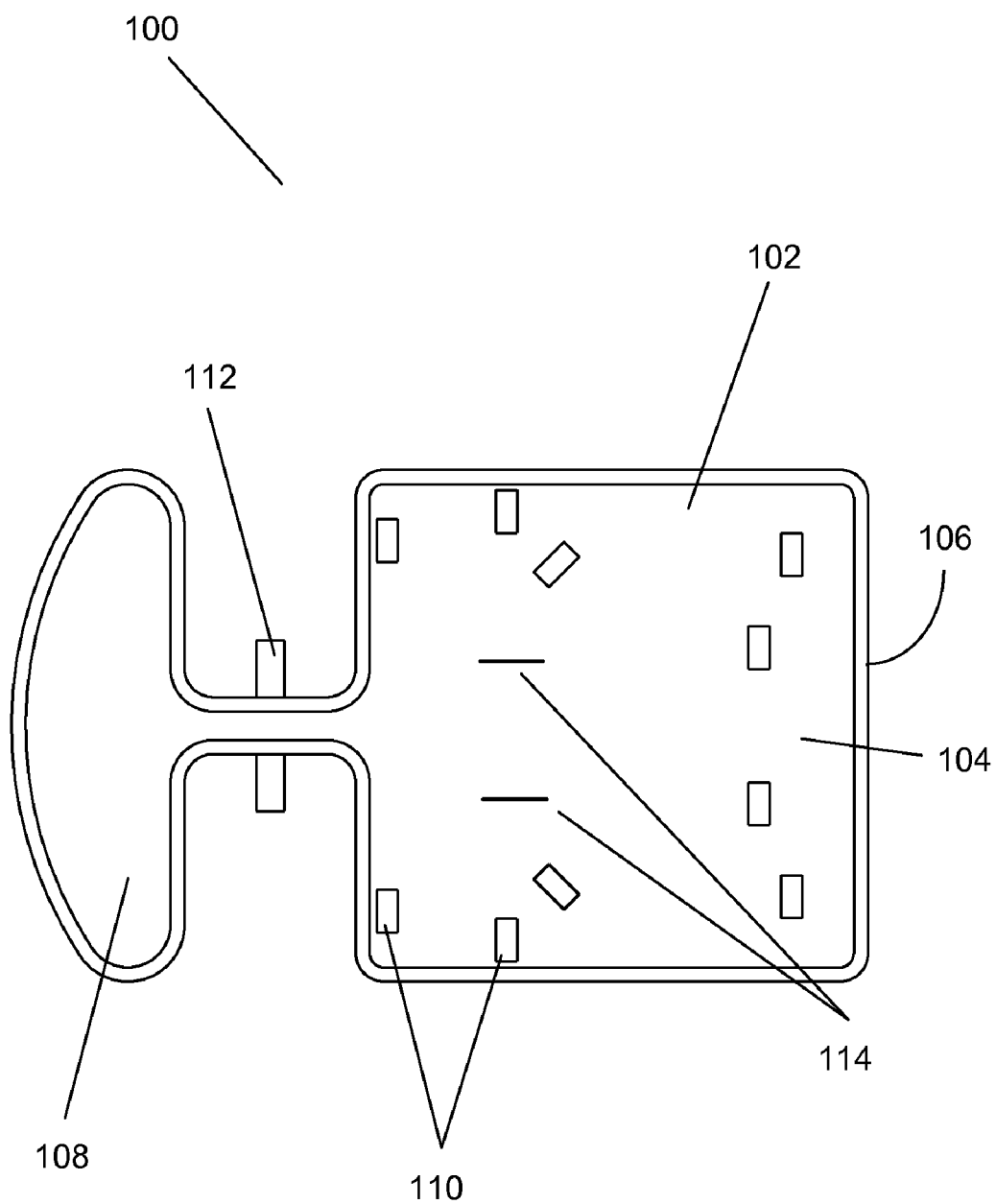
FIG. 1 depicts a top view of one embodiment of a protective cover.

FIG. 1 depicts a top view of one embodiment of a protective cover 100 in a fully extended, open position. A cover 100 can comprise a substantially planar body 102 having a top surface 104 and a bottom surface 106, at least one extension member 108, and a plurality of fastening components 110. In some embodiments, a cover 100 can further comprise a seat fastener 112, as depicted in FIG. 1; however, in alternate embodiments, such as that shown in FIG. 8, a cover 100 can be devoid of a seat fastener 112.

A substantially planar body 102 can be substantially rectangular, as depicted in FIG. 1, or can be circular, ovular, triangular, or can have any other known and/or convenient geometry. In some embodiments, a substantially planar body 102 can have a perimeter edge that can be coupled with piping material or any other type of decorative edge material. In some embodiments, a perimeter edge can be semi-rigid or stiff and/or can be formable and/or elastomeric. In other embodiments, a perimeter edge can be weighted and/or can have non-skid properties.

Figure 3:
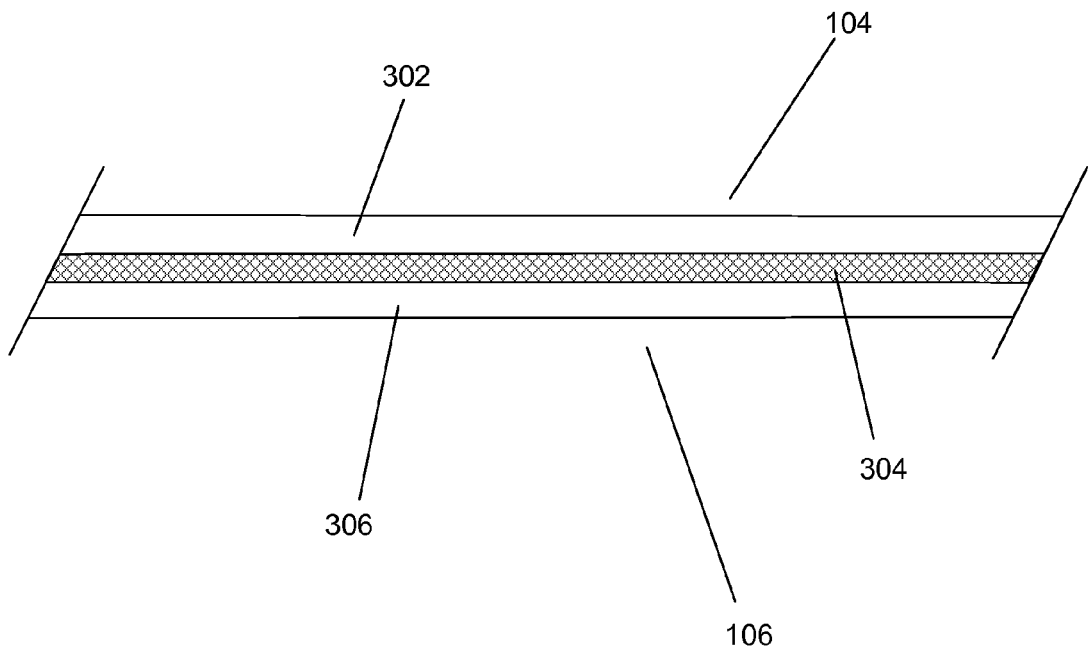
FIG. 3 depicts a partial cross-sectional view of the layers of a protective cover.

A substantially planar body 102 can comprise a plurality of substantially planar layers, as depicted in FIG. 3. In the embodiment depicted, a substantially planar body 102 has three layers: two outer layers 302 and 306, and one inner layer 304. The top side of an outer layer 302 can at least partially form the top surface 104 of a cover 100, and the underside of an outer layer 302 can be at least partially coupled with the top side of an inner layer 304. The underside of an inner layer 304 can be at least partially coupled with the top side of an outer layer 306, and the underside of an outer layer 306 can at least partially form the bottom surface 106 of a cover 100. However, in alternate embodiments, a substantially planar body 102 can have any other known and/or convenient number and/or types of layers.

Referring to FIG. 3, an outer layer 302 and/or outer layer 306 can be flexible and can be made of woven or non-woven fabric, polymer, silicone, vinyl, paper products, nylon or any other known and/or convenient material or combination of materials, and/or can be machine or hand-washable. In alternate embodiments, a substantially planar body 102 can be made of elastomeric material, such as Lycra® or Versalloy®. In yet other embodiments, a substantially planar body 102 can be made of disposable material appropriate for single-use, such as but not limited to polyethylene resin or any other known and/or convenient material. In the embodiment shown in FIG. 3, an outer layer 302 comprises woven fabric and an outer layer 306 comprises polyester interlock fabric coated with 1-2 millimeters of polyurethane to allow for easy clean-up in case of soiling. In other embodiments, an outer layer 302 can be at least partially made of oilcloth. In yet other embodiments, layers 302 and/or 306 can comprise any other known and/or convenient type of material. Moreover, layers 302 and/or 306 can have decorative prints or patterns, can be solid colors, or can have any other known and/or convenient visual properties.

An outer layer 302 and/or 306 can have ridges or can be smooth, or can have any other known and/or convenient surface characteristics. In some embodiments, a layer 302 and/or 306 can have intrinsic anti-bacterial properties. In alternate embodiments, a layer 302 and/or 306 can have anti-bacterial and/or ultraviolet protective coating. A layer 302, 304 and/or 306 can be formed by injection molding or any other known and/or convenient manufacturing process. In some embodiments, at least one layer 302, 304 or 306 can be at least partially waterproof or water-resistant, and/or can be resistant to body fluids and/or substances.

Figure 2:
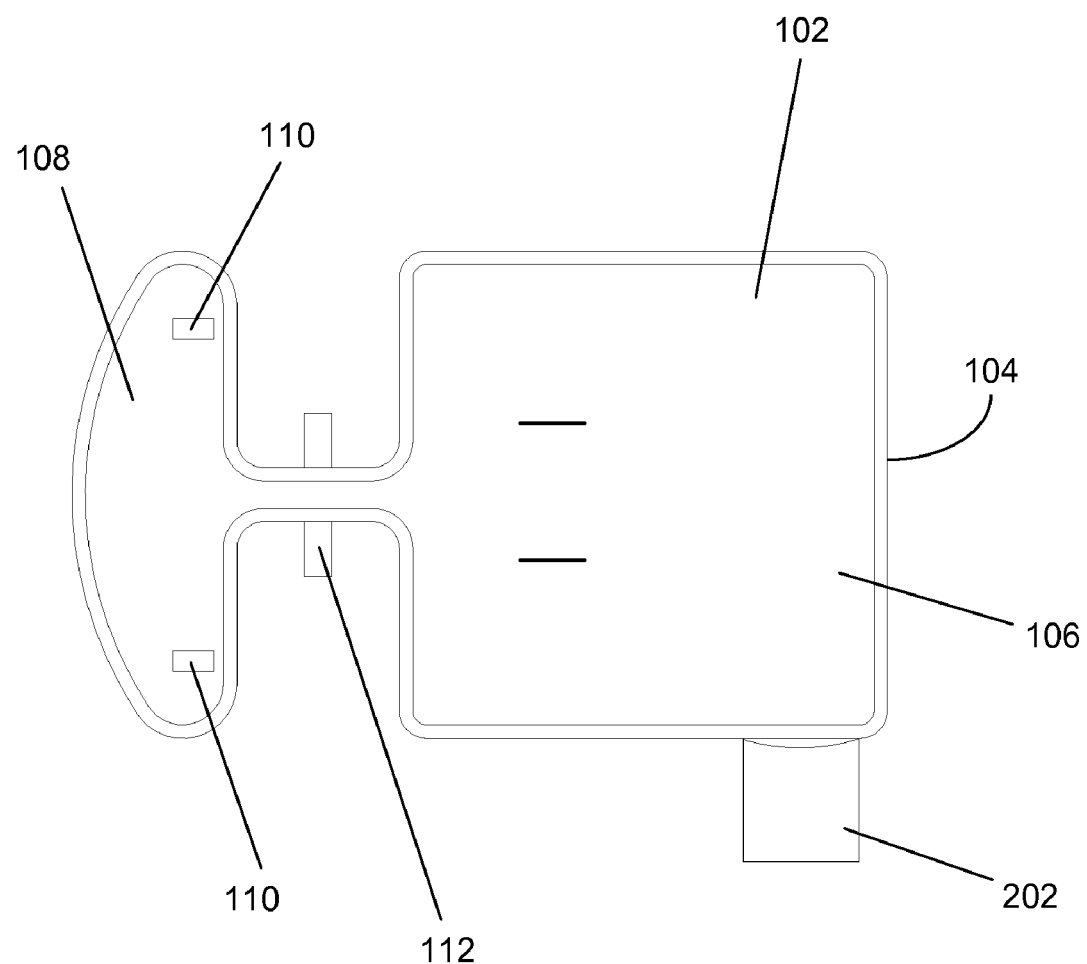
FIG. 2 depicts a bottom view of one embodiment of a protective cover.

In the embodiment depicted in FIGS. 1-3, an inner layer 304 can be an insulator. An insulator 304 can be a material that can minimize thermal transfer between a surface and a child for a desired amount of time. In the embodiment depicted in FIGS. 1-3, an insulator 304 can be comprised of Insul-Bright® material, comprising hollow, polyester fibers needle-punched through a nonwoven substrate and through a reflective metalized poly film. The hollow fibers resist conduction while the reflective metalized poly film resists radiant energy. (Needle-punching is the process of compacting and tying together fibers with or without a base material. Hundreds of needles punch a sheet of processed fibers into a substrate to hold the batting together.)

In alternate embodiments, an insulator 304 can be a permanent or removable pouch filled with insulating gel or any other known and/or convenient fluid with desired insulating properties. In such an embodiment, a substantially planar body 102 can have a pocket whereby it can accept a removable pouch of insulating material. In other embodiments, an insulator 304 can be at least partially made of polyester film such as Mylar®, Melinex®, and/or Hostaphan®, and/or can be comprised of disposable material suitable for one-time use. In yet other embodiments, an insulator 304 can be suitable for multiple uses. An insulator 304 can have any known and/or convenient geometry, and can have geometry different from that of layers 302 and 306. In other embodiments, a layer 304 can be made of non-insulating material.

Layers 302, 304, and 306 can be coupled with each other using various methods. In the embodiment depicted in FIG. 3, substantially the entire underside of outer layer 302 is bonded to substantially the entire upper side of insulator layer 304 using adhesive. Likewise, substantially the entire underside of layer 304 is bonded to substantially the entire upper side of outer layer 306 using adhesive. Adhesive can be any known and/or convenient adhesive suitable for bonding the material of an inner layer 304 to an outer layer 302 and/or 306, such as but not limited to gel adhesive, fabric glue, fusible webbing, spray adhesive, laminate, or any other known and/or convenient bonding agent. In other embodiments, layers 302, 304 and 306 can be coupled with each other via stitching or bonding around their respective perimeters and/or at any other known and/or convenient location on a cover 100.

At least one extension member 108 can extend from a perimeter edge of a substantially planar body 102, can be substantially planar, and/or can lie in substantially the same plane as the substantially planar body 102 when a cover 100 is in a fully extended, open configuration, as depicted in FIGS. 1-2. In other embodiments, at least one extension member 108 can extend from a substantially planar body 102 in any other known and/or convenient manner. An extension member 108 can be a continuous extension of the material and/or layers that comprise a substantially planar body 102, as depicted in FIG. 1. In other embodiments, an extension member 108 can be coupled with a substantially planar body 102 via a bonding agent, sewing, or any other known and/or convenient type of permanent attachment. In yet other embodiments, an extension member 108 can be removably coupled with a substantially planar body 102 via snaps, hook and loop members, buttons, or any other known and/or convenient mechanism that can allow an extension member 108 to be selectively removed from a substantially planar body 102.

Figure 8:
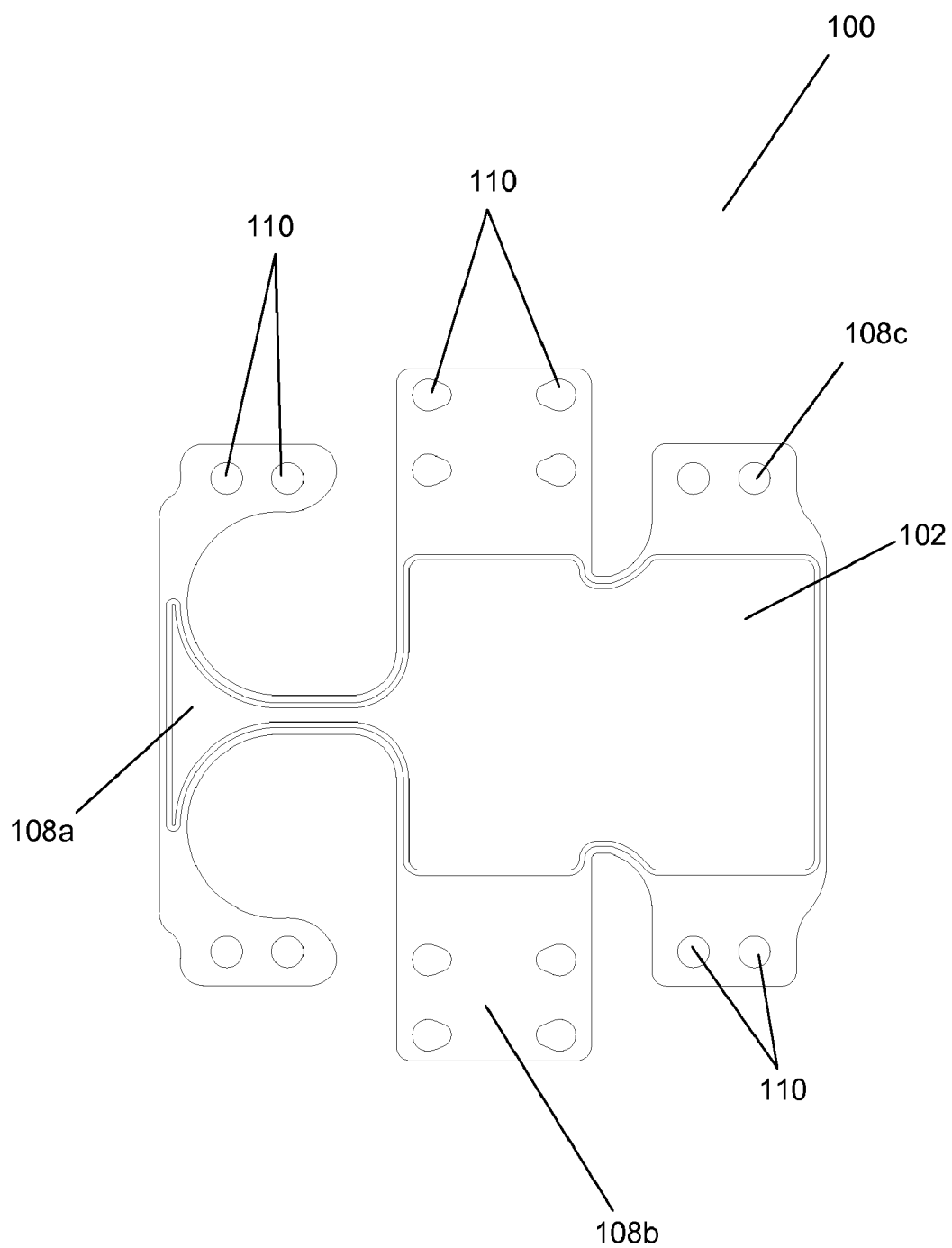
FIG. 8 depicts a top view of an alternate configuration of a protective cover having multiple extension members.

In the embodiment depicted in FIG. 1, an extension member 108 has a mushroom shape, however in other embodiments an extension member 108 can have geometry similar to one of the extension members 108 depicted in FIG. 8. In other embodiments, an extension member 108 can have any other known and/or convenient geometry. In some embodiments, a cover 100 can comprise a single extension member 108, as depicted in FIG. 1. However, in alternate embodiments a substantially planar body 102 can comprise a plurality of extension members 108 as shown in FIG. 8.

Figure 4:
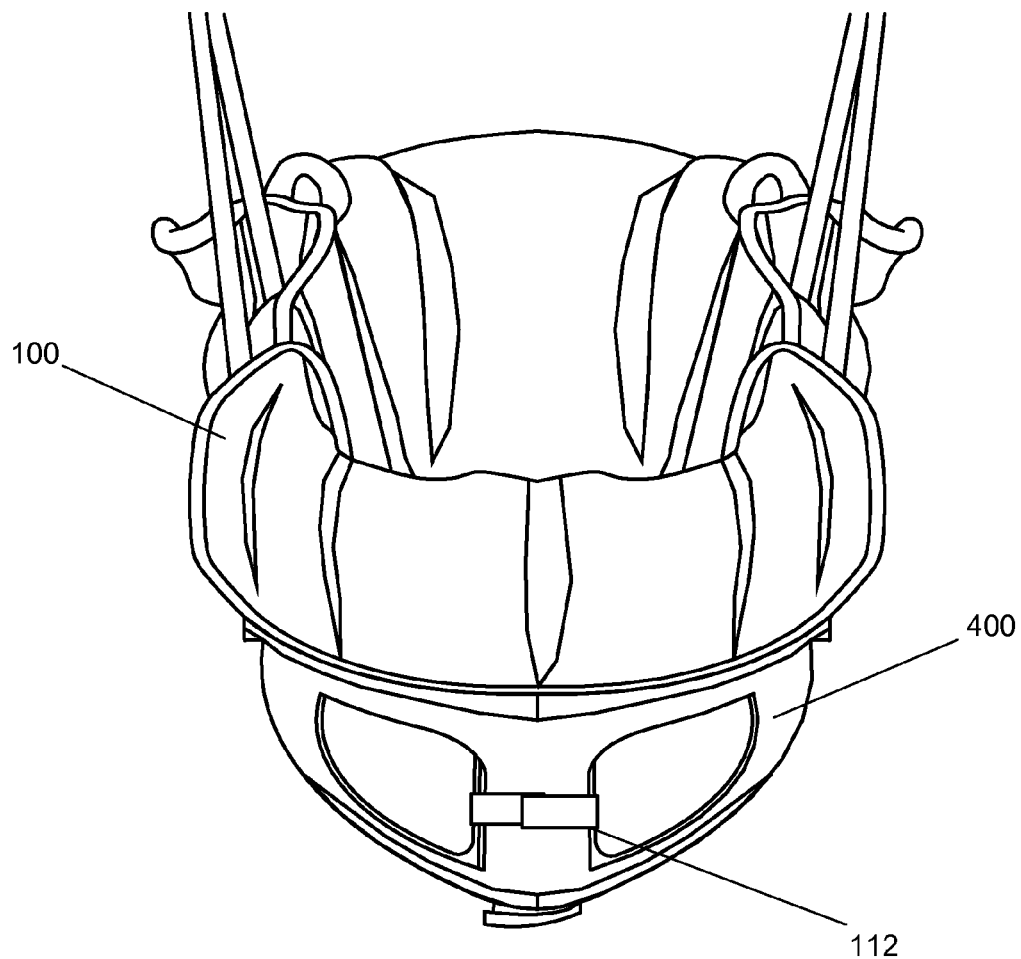
FIG. 4 depicts one embodiment of a protective cover being used with a bucket swing seat.
Figure 5:
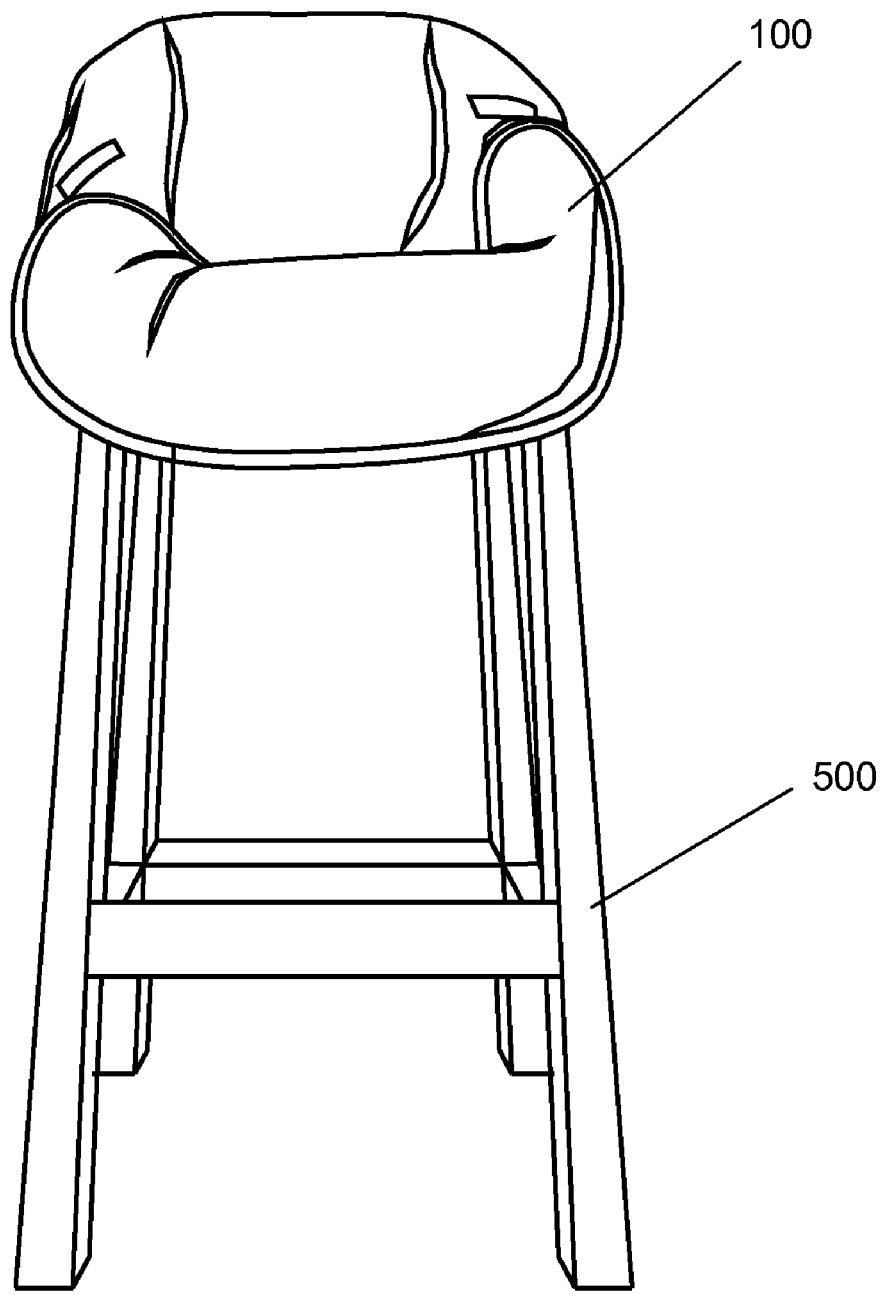
FIG. 5 depicts an alternate embodiment of a protective cover being used with a high chair.

In some embodiments, a cover 100 can be used in conjunction with a bucket swing seat 400 (as shown in FIG. 4), a high chair 500 (as shown in FIG. 5), and/or any other known and/or convenient type of child's seat that has leg openings through which a child's legs can pass. Thus, a substantially planar body 102 and at least one extension member 108 can have geometries to likewise accommodate a child's legs when in use. In yet other embodiments, an extension member 108 can have any other known and/or convenient geometry.

An extension member 108 can be flexible and can be made of woven or non-woven fabric, polymer, silicone, vinyl, nylon, paper product or any other known and/or convenient material or combination of materials. In alternate embodiments, at least one extension member 108 can be made of elastomeric material, such as Lycra® or Versalloy®. In yet other embodiments, at least one extension member 108 can be made of disposable material suitable for one-time use. In the embodiment depicted in FIG. 1, an extension member 108 can be comprised of the same materials and/or layers as a substantially planar body 102. In alternate embodiments, an extension member 108 can comprise one layer, or can comprise multiple layers that are at least partially different from the materials and/or properties of a substantially planar body 102. An extension member 108 can be any known and/or convenient color or combination of colors and can be a different color or combination of colors than that of a substantially planar body 102.

A cover 100 can further comprise a plurality of complementary fastening components 110 that can be used to selectively configure a cover 100 depending on the desired application. In the embodiment depicted in FIGS. 1-2, a substantially planar body 102 can have ten fastening components 110 coupled with the top surface 104 of a substantially planar body 102, and two fastening components 110 coupled with the bottom surface 106 of an extension member 108. As shown, some of the fastening components 110 coupled with the top surface 104 of a substantially planar body 102 are positioned proximate to the perimeter edge of a substantially planar body 102, while others are positioned further toward the center of the substantially planar body 102. This placement of a plurality of fastening components 110 can allow an extension member 108 to be selectively and temporarily coupled with the top surface 104 of a substantially planar body 102 in multiple configurations, depending on user preference and application. However, in alternate embodiments, a plurality of fastening components 110 can be coupled with a substantially planar member 102 and/or extension member 108 in any other desired placement configuration.

In FIG. 1, fastening components 110 are complementary hook and loop members. However, in alternate embodiments, fastening components 110 can be snaps, reusable or single-use adhesive, aperture and protrusion, or any other known and/or convenient type of fastening components or combination of types of fastening components. Moreover, in some embodiments, a cover 100 can have any other known and/or convenient number of complementary fastening components 110. For example, in the embodiment of a cover 100 depicted in FIG. 8, extension members 108a and 108c have a plurality of apertures 110, and an extension member 108b can have a plurality of protrusions 110, such that extension members 108a and 108c can be selectively mated with extension member 108b. In other embodiments, any convenient number of fastening components 110 can be located at any other known and/or convenient locations on an extension member 108 and/or substantially planar body 102, such that a cover 100 can be configured to adapt to children of different body types and/or surfaces having different geometries.

A cover 100 can further comprise a seat fastener 112, as depicted in FIGS. 1-2. When used in conjunction with a swing seat 400, as depicted in FIG. 4, a seat fastener 112 can temporarily secure a cover 100 to the part of the seat 400 that lies between the leg openings, thus preventing slippage or excessive movement of the cover 100 when in use. A seat fastener 112 can also be used in conjunction with a high chair 500, shopping cart 600, or any other known and/or convenient surface or seat.

As shown in FIGS. 1-2, a seat fastener 112 can be coupled with an extension member 108. In the embodiment shown, an extension member 108 comprises layers and an elongated seat fastener 112 can extend through and be secured by the layers. In alternate embodiments, a seat fastener 112 can be coupled with an extension member 108 in any other manner, or can be coupled with a surface 104 106 and/or layers 302 304 306 of a substantially planar member 102. As depicted, a seat fastener 112 can be an elongated piece of hook and loop material, but in other embodiments, a seat fastener 112 can comprise snaps, aperture and protrusions, hook and eye closures, or any other known and/or convenient type of fastening mechanism, and can have any other known and/or convenient geometry.

In some embodiments, fastening components 110 and/or a seat fastener 112 can be used to temporarily fasten toys, keys, and/or other accessories to a cover 100. In yet other embodiments, fastening components 110 can be mated with complementary fastening members located on a seat, stroller, or any other convenient surface such that a cover 100 can be selectively coupled with a desired surface, thereby preventing excessive movement of a cover 100 when in use.

As shown in FIG. 1, a cover 100 can further comprise a plurality of slits 114 that can be adapted to accept high-chair safety straps, which are common on many high chairs 500. Slits 114 can be positioned and have the appropriate dimensions to accommodate high chair safety straps. In some embodiments, a cover 100 can comprise more than two slits 114 to account for different high chairs 500 having safety straps in different locations.

In some embodiments, a cover 100 can further comprise a storage pocket 202, as depicted in FIG. 2. A cover 100 can be stuffed into a pocket 202, thus providing compact storage of a cover 100 when not in use. In alternate embodiments, a pocket 202 can be used to store keys, toys, pacifiers, and/or any other known and/or convenient accessory. A pocket 202 can be a separate component that can be permanently or removably attached to a cover 100, as shown in FIG. 2, or can alternately be integral with a surface 104 or 106 of a substantially planar body 102 and/or an extension member 108.

In use, the cover 100 shown in FIG. 1 can be placed on a horizontal surface in a fully planar position, with a top surface 104 facing upward and a bottom surface 106 in contact with the horizontal surface. A user can then raise an extension member 108 toward a substantially planar body 102, and vice versa, bringing the fastening components 110 of an extension member 108 in contact with the fastening components 110 of the substantially planar member 108. Complementary fastening components 110 can then be mated such that a "bucket" configuration is achieved and the cover 100 is configured to substantially conform to a swing seat 400, high chair 500, shopping cart 600 seat, or any other known and/or convenient seat. The cover 100 can then be placed in a seat such that the leg openings of a cover 100 are aligned with the leg openings of the seat. A child can then be placed in the seat, with a cover 100 providing a protective barrier between the child and the seat.

In alternate embodiments, a cover 100 can be placed on a horizontal surface in a planar position and a child can sit on the cover 100. Exposed portions of a substantially planar body 102 and an extension member 108 can then be joined together via fastening components 110 to substantially conform to the child's body. The child with cover 100 attached can then be picked up and placed in a seat 400, 500, 600 or any other child's seat. In yet other embodiments, any other known and/or convenient method can be employed to configure a cover 100 for a desired application.

Figure 6:
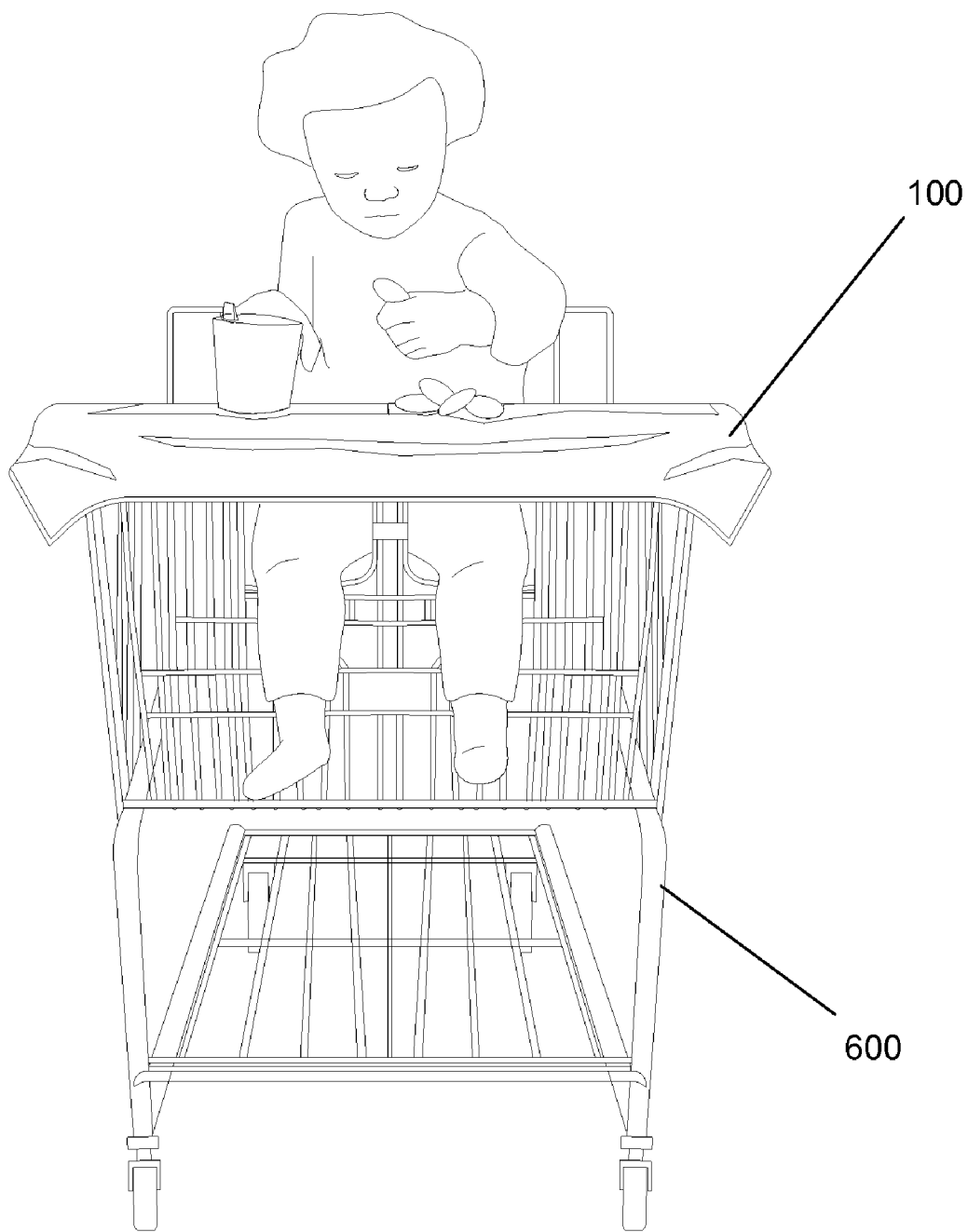
FIG. 6 depicts an alternate embodiment of a protective cover being used with a shopping cart.
Figure 7:
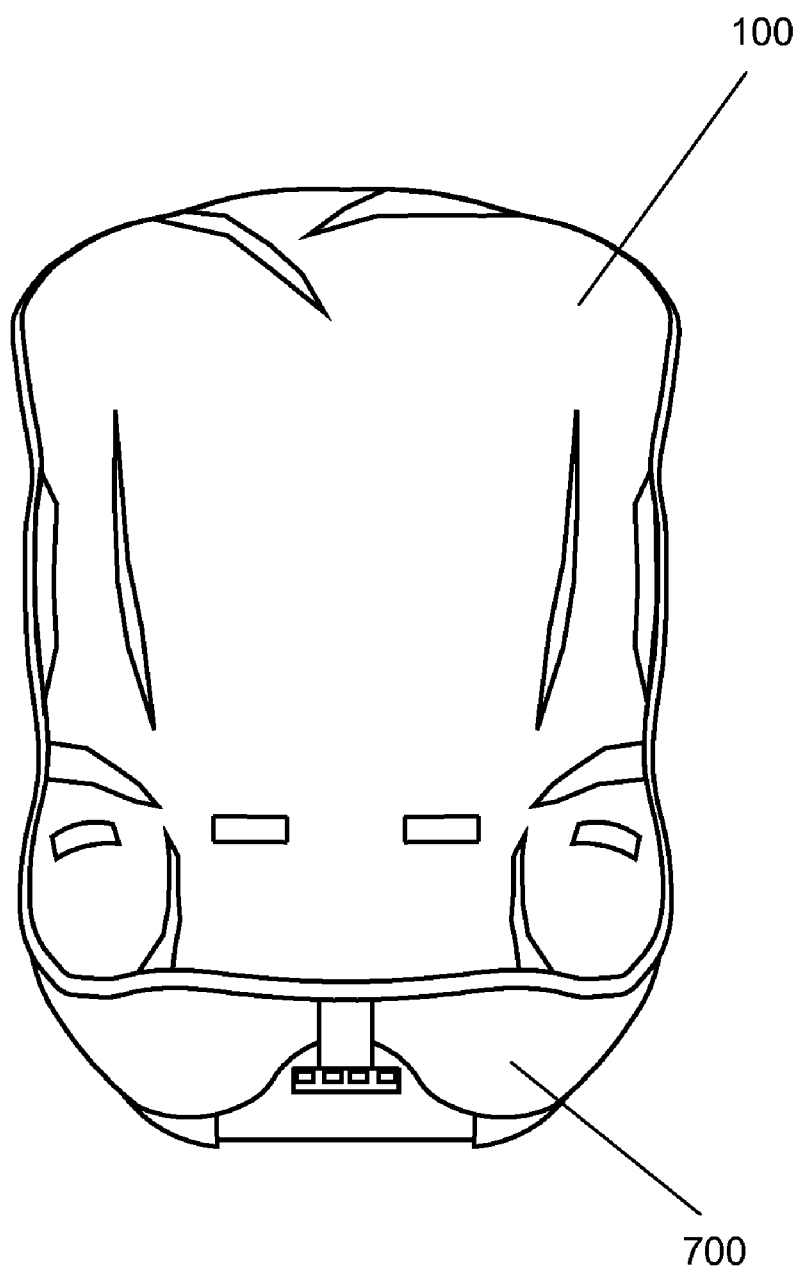
FIG. 7 depicts an alternate embodiment of a protective cover being used with a car seat.

A cover 100 can also be used in other applications. In some embodiments a cover 100 can be draped over a car seat 700 when the car seat 700 is not in use, as shown in FIG. 7, thus preventing the car seat 700 from getting too hot when exposed to the sun or extreme heat. In some embodiments, a cover 100 can also be used on the seat of a car seat 700 to provide a protective barrier between a child and the car seat surface 700. In other embodiments, and as shown in FIG. 6, a cover 100 can be draped over the handle bars of a shopping cart 600, thereby providing a protective surface on which a user can place food, toys, pacifiers, or any other known and/or convenient item. In yet other embodiments, a cover 100 can be used in conjunction with a stroller, either as a barrier between a child and the seat of a stroller, or as a cover to drape over the top of a stroller to block harmful UV rays, rain, or other elements from a child. Moreover, a cover 100 can be used in a substantially planar configuration as a diaper changing pad, a play mat, or a placemat. A cover 100 can also be used in any other known and/or convenient manner or configuration.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A protective cover, comprising:
    a substantially planar flexible body having a top surface and a bottom surface, said substantially planar flexible body comprising a body section and at least one extension member having a thin portion and a wide portion, wherein one end of said thin portion is directly permanently coupled with and extends from the perimeter of said body section, and wherein the opposing end of said thin portion is coupled with said wide portion;
    a first set of complementary fastening components coupled with the bottom surface of said at least one extension member; and
    a second set of complementary fastening components coupled with the top surface of said body section;
    wherein each member of said first set of complementary fastening components is configured to selectively mate with one or more members of said second set of complementary fastening components, and
    said at least one extension member is positioned such that when each member of said first set of complementary fastening components on the bottom surface of said at least one extension member is coupled with a member of said second set of complementary fastening components on the top surface of said body section, said body section and said at least one extension member together form a substantially bucket shaped configuration.

2. The protective cover of claim 1, wherein said substantially planar flexible body comprises a plurality of layers.

3. The protective cover of claim 2, wherein said plurality of layers comprises a fabric layer, an insulating layer, and a water-resistant layer.

4. The protective cover of claim 3, wherein said insulating layer comprises a plurality of hollow fibers needle-punched through a nonwoven substrate and through a reflective metalized poly film.

5. The protective cover of claim 1, wherein when said body section and said at least one extension member are in said substantially bucket shaped configuration, said substantially planar flexible body is configured to be placed into a child's seat chosen from the group consisting of: a bucket swing seat, a high chair seat, and a shopping cart seat.

6. The protective cover of claim 1, further comprising a seat fastener coupled with said at least one extension member, wherein said seat fastener extends away from said extension member, such that said seat fastener is configured to be secured around a portion of a child's seat to temporarily secure said protective cover to said child's seat.

7. The protective cover of claim 1, further comprising a storage pocket.

8. The protective cover of claim 1, further comprising a plurality of slits in said substantially planar flexible body away from the perimeter of said substantially planar flexible body, wherein said plurality of slits is adapted to accept high chair safety straps.

9. The protective cover of claim 1, wherein each member of said first and second sets of complementary fastening components is chosen from the group consisting of:
hook and loop fasteners, protrusion and aperture fasteners, adhesive, snaps, button and slit fasteners, and hook and eye fasteners.

10. The protective cover of claim 1, wherein gaps wide enough for a child's legs are positioned between said wide portion and said body section on either side of said thin portion.

11. The protective cover of claim 10, wherein said gaps are configured to be aligned with leg openings in a child's seat when said body section and said at least one extension member are in said substantially bucket shaped configuration.

* * * * *